Patented Dec. 24, 1940

2,225,626

UNITED STATES PATENT OFFICE 2,225,626

PROCESS FOR TREATING LEAD OXIDIZED ORES

Edward Eisenhauer, Jr., Los Angeles, Calif.

No Drawing. Application May 16, 1939,
Serial No. 273,945

6 Claims. (Cl. 83—94)

This invention relates to a process for the recovery of the metallic values from oxidized lead ores, such as the lead carbonates.

Lead carbonates such as cerussite are abundant in nature but the recovery of the metallic values therefrom has never been commercially successful. Attempts have been made to make a mechanical recovery of the values by jigging and wet and dry table concentration. These attempts have not been a commercial success for the oxidized lead, gold and silver content disintegrates and slimes badly and passes readily with the water to the tailings. Attempts at direct flotation have likewise not been successful due to the fact that the oxidized lead wets as readily as the gangue and will not float. The zinc that is always present in such ores makes smelting of the ores an expensive procedure.

The principal object of this invention is to provide a commercially successful process for recovering the metallic values, such as gold, silver and lead, from oxidized lead ores.

Other objects are to provide a process which will require only the usual equipment of an ordinary concentrating mill so that mill investment is reduced to a minimum; to provide a process which will produce a concentrate from ore of this type in which zinc and its resulting smelting penalty will be eliminated or at least reduced to a minimum; and to provide a process in which froth flotation can be successfully used.

Other objects and advantages reside in the process. These will become more apparent from the following detailed description.

The process is more particularly designed for ores of the lead carbonate varieties, such as "cerussite," but it is not, of course, limited to these particular ores as it will be found valuable for the recovery of metallic values from other oxidized ores. Cerussite is a lead carbonate ore having the general formula $PbCO_3$, but may also carry commercial values of gold, silver, and copper in addition to the lead and usually carries small percentages of undesirable zinc.

The essence of the invention is the provision of a simple and highly efficient process which will render the desired metallic values amenable to recovery by flotation. In their natural state, the oxidized metals in the ore absorb the water in a flotation cell to form a thick mud or slime which quickly settles and which cannot be floated. Attempts have been made to convert the oxides to floatable sulphides prior to flotation but these attempts have not been commercially successful due to inability, without prohibitive expense, to obtain a complete conversion of all values to sulphides. With this process, however, 95% recoveries have been cheaply made on ores which under the best and most expensive prior processes have never run over 50% recovery.

Briefly, this invention contemplates the formation of nascent $H_2S$ gas in the interstices of the pulp body during the time the pulp is being subjected to the violent pounding, crushing and grinding action of a ball mill or other mechanical crushing and comminuting machine.

Treatment of the ore with $H_2S$ from an outside source would not accomplish the same result for the nascent state of the gas persists only for a matter of seconds after its formation and applied gas would therefore not have the great affinity for the metals necessary for a complete conversion, nor could it be sufficiently dispersed throughout the mass to contact all particles.

Treatment of the ore with hydrogen-sulphide-forming materials independent of the grinding or crushing step would not attain the same efficient results since the violent crushing and pounding at the exact instant the gas is formed is necessary to compress the cells and interstices in the pulp and drive the gas into the interior of the disintegrating particles where it will intimately contact each microscopic metallic grain.

However, by forming the gas within all the minute cellular spaces in the pulp and then instantly pounding and crushing the pulp before the gas leaves its active nascent state so as to drive it into the internal cellular structure of the grains and particles, we intimately contact every molecule of metal with a gas which is at that instant in its most active condition.

In carrying out the process, a soluble sulphide, such as sodium sulphide, and a soluble reaction agent to liberate $H_2S$ therefrom are independently fed to a ball mill or other grinding apparatus simultaneously with the supply of ore thereto. The ore is preferably supplied as a 40% wet pulp. It can, however, be fed dry and sufficient water added in the mill to bring the contents to a substantially 40% wet pulp. The two sulphidizing agents and the ore pulp are thoroughly intermixed by the violent action of the mill so that the two agents will be brought together while in widely dispersed condition throughout the pulp. This causes a uniform formation of $H_2S$ throughout the entire pulp mass in intimate contact with the oxidized metallic particles therein. The nascent gas instantly and completely converts the oxides of the metals present to sulphides. There is undoubtedly a secondary conversion directly between the sodium sulphide and the ore and it appears that the additional H₂S present acts as a catalyst to facilitate this secondary action, for results attained by the addition of the second H₂S forming agent are far in excess of the results attained by the use of the sulphide alone.

Experience indicates that not less than 7 pounds of sodium sulphide, Na₂S, and not less than 1½ pounds of a second reagent per ton or ore should be used. The second reagent may be any suitable acid soluble or acid salt which will combine with the sulphide to liberate H₂S such as sodium bicarbonate, NaHCO₃, or sodium acid sulphate, NaHSO₄. The latter reagent due to its high acid content gives a faster action than the bicarbonate and it is preferred on low lime content ores. On ores having a high lime content however, the acid action of the sodium acide sulphate is neutralized by the lime and the use of the bicarbonate is preferred since the latter salt reacts with the lime so slowly that the objects of the invention are completed before any interference can take place.

With the bicarbonate the reaction is:

$$Na_2S + 2NaHCO_3 = 2Na_2CO_3 + H_2S$$

With the sodium acid sulphate the reaction is:

$$Na_2S + 2NaHSO_4 = 2Na_2SO_4 + H_2S$$

The reaction of the hydrogen sulphide on the oxidized lead in the ore is:

$$PbCO_3 + H_2S = PbS + H_2O + CO_2$$

and a similar reaction takes place with the other metallic values present, with the exception perhaps of the zinc. The carbon dioxide is evolved from the ore in the ball mill or crusher.

If ores of an exceedingly high lime content are encountered, it is advisable to employ an ammonium salt, such as ammonium chloride, as the second reagent. Very high extractions have been obtained from its use. It is believed that this is due to the fact that the ammonium chloride, NH₄Cl, unites with the sodium hydroxide, formed by the decomposition of the sodium sulphide in water, to form ammonia gas, NH₃, $$Na_2S + 2H_2O = 2NaOH + H_2S$$

then $$NaOH + NH_4Cl = NH_3 + NaCl + H_2O$$

The ammonia gas then unites with the hydrogen sulphide freed from the original sodium sulphide to form unstable nascent ammonium sulphide, (NH₄)₂S, an extremely active sulphidizing agent.

$$2NH_3 + H_2S = 2(NH_4)_2S$$

From the grinding and sulphidizing step the pulp is fed directly to flotation cells where it is floated with any of the standard flotation and frothing reagents as is usual with sulphide ores. The resulting concentrate is ready for shipment or smelting.

Most, if not all, lead carbonate ores carry traces of zinc which if allowed to remain in the final concentrate interfere with smelting. This process appears to automatically remove the vexatious zinc problem for no zinc appears in the concentrate from the flotation cells.

Perhaps this is due to the fact that the zinc is not converted to the sulphide under the conditions present in the grinding mill, or perhaps the sulphide, if formed at all, is not stable, or perhaps it forms too slowly to be completed in the short time interval in the mill. However, it does appear that an automatic classification and elimination of the zinc from the other metals present is obtained by this process.

While a specific process has been described herein it is desired to be understood that the same may be varied within the scope of the claims without departing from the spirit of the invention.

I claim:

1. A process for treating oxidized ore for the recovery of the metallic values therefrom comprising: feeding said ore to a wet ball mill; simultaneously feeding sodium sulphide and sodium bicarbonate to said mill; grinding the mixture to a pulp; thence treating the resulting pulp by flotation to recover the metallic values therefrom.

2. A process for treating oxidized ore for the recovery of the metallic values therefrom comprising: feeding said ore to a wet ball mill; simultaneously feeding sodium sulphide and sodium acid sulphate to said mill with said ore; grinding the mixture in the presence of water to a pulp; thence treating the pulp by froth flotation to recover the resulting metallic sulphides therefrom.

3. A process for treating oxidized ore for the recovery of the metallic values therefrom comprising: feeding said ore to a wet ball mill; simultaneously feeding sodium sulphide and ammonium sulphate to said mill with said ore; grinding the mixture in the presence of water to a pulp; thence treating the pulp by flotation to recover the resulting metallic sulphides therefrom.

4. A method of sulphidizing oxidized ores prior to flotation comprising: admixing dry sodium acid sulphate and dry sodium sulphide with said ores; thence grinding the mixture together in the presence of moisture.

5. A method of sulphidizing oxidized ores prior to flotation comprising: adding dry sodium bicarbonate and dry sodium sulphide to said ores; thence grinding the mixture together in the presence of moisture.

6. A method of sulphidizing oxidized ores prior to flotation comprising: admixing dry sodium sulphide and a dry ammonium salt with said ores; thence grinding the mixture in the presence of moisture to form nascent ammonium sulphide and ammonia in the interstices of said ore; thence subjecting said ore to flotation.

EDWARD EISENHAUER, Jr.